United States Patent
Huang

(10) Patent No.: US 7,921,831 B2
(45) Date of Patent: Apr. 12, 2011

(54) HYDROGEN-OXYGEN FUEL SUPPLYING SYSTEM

(76) Inventor: Kuo-Fong Huang, Taoyuan (TW)

( * ) Notice: Subject to any disclaimer, the term of this patent is extended or adjusted under 35 U.S.C. 154(b) by 470 days.

(21) Appl. No.: 12/108,683

(22) Filed: Apr. 24, 2008

(65) Prior Publication Data

US 2009/0266710 A1   Oct. 29, 2009

(51) Int. Cl.
F02B 43/08 (2006.01)
C25B 1/04 (2006.01)

(52) U.S. Cl. ............... 123/575; 123/3; 204/266

(58) Field of Classification Search ........... 123/1 A, 123/3, 575; 204/266
See application file for complete search history.

(56) References Cited

U.S. PATENT DOCUMENTS

| | | | |
|---|---|---|---|
| 3,648,668 A * | 3/1972 | Pacheco | 123/3 |
| 4,382,189 A * | 5/1983 | Wilson | 290/3 |
| 4,442,801 A * | 4/1984 | Glynn et al. | 123/3 |
| 5,119,768 A * | 6/1992 | Russell | 123/1 A |
| 5,513,600 A * | 5/1996 | Teves | 123/3 |
| 6,263,838 B1 * | 7/2001 | Richardson, Jr. | 123/3 |
| 6,311,648 B1 * | 11/2001 | Larocque | 123/3 |
| 6,659,049 B2 * | 12/2003 | Zagaja et al. | 123/3 |
| 6,698,389 B2 * | 3/2004 | Andrews et al. | 123/DIG. 12 |
| 6,716,546 B2 * | 4/2004 | Oglesby et al. | 429/444 |
| 7,100,542 B2 * | 9/2006 | Ehresman | 123/3 |
| 7,273,044 B2 * | 9/2007 | Flessner et al. | 123/536 |
| 7,401,578 B2 * | 7/2008 | Otterstrom et al. | 123/3 |
| 2006/0065214 A1 | 3/2006 | Flessner et al. | |
| 2006/0090712 A1 | 5/2006 | Ehresman et al. | |
| 2006/0260562 A1 | 11/2006 | Otterstrom et al. | |

FOREIGN PATENT DOCUMENTS

EP  0 333 664 A2  9/1989
WO  2007/101329 A1  9/2007

OTHER PUBLICATIONS

European search report.

* cited by examiner

*Primary Examiner* — Stephen K Cronin
*Assistant Examiner* — Arnold Castro
(74) *Attorney, Agent, or Firm* — Chun-Ming Shih; HDLS IPR Services

(57) ABSTRACT

A hydrogen-oxygen fuel supplying system includes a water hydrolyzing apparatus, a heat dissipation apparatus connected to the water hydrolyzing apparatus, a filter connected to the water hydrolyzing apparatus, a supercharger connected to the filter, a hydrogen-oxygen container connected to the filter, and a pressure adjusting means connected to the hydrogen-oxygen container. The water hydrolyzing apparatus is used to hydrolyze water thereby producing a mixture gas of hydrogen, oxygen, and water vapor. The heat dissipation apparatus is used to dissipate heat generated in the water hydrolyzing apparatus. The filter is used to filter water vapor in the mixture gas. The supercharger is used to compress the hydrogen and oxygen. The hydrogen-oxygen container is used to store the hydrogen and oxygen. The pressure adjusting means is used to regulate an output of the hydrogen and oxygen. The hydrogen-oxygen fuel supplying system can reduce pollution of air and environment.

1 Claim, 2 Drawing Sheets

HYDROGEN-OXYGEN FUEL SUPPLYING SYSTEM

BACKGROUND

The present invention generally relates to a fuel supplying system, and more especially, to a hydrogen-oxygen fuel supplying system.

Currently, greenhouse effect warming in the earth is becoming more and more apparent, which results in desertification of soil, sandstorm, air pollution, heat weave, extreme climate, disappearance of lakes and fresh water shortage. The cause of the greenhouse effect warming is pollution gas produced by overfull usage of gasoline and petroleum in heavy industry, various vehicles such as airplane, steamboat, and cars. Although most countries in the world are carrying out plan of energy saving and pollution prevention; however, such efforts can't radically solve above problems, and even can't overtake increment of pollution.

Nowadays, all the people in world suffer from continuously risen oil price and electricity price. Shortage of petroleum and pollution produced from use of petroleum get people in a dilemma that we have to use petroleum. Every country is dedicated to develop alternative energy, for example, solar energy and wind energy, to replace petroleum. Currently, the entire world gives expectation to a new technology of hydrogen energy (fuel cell). However, there is a long period when the general power source such as cars and generator can be replaced with hydrogen energy, to say nothing of special power source used in heavy industry and aerostat.

However, petroleum and electric energy are main cause of greenhouse effect and energy pollution. Therefore, there is a desire to completely solve pollution from use of energy and greenhouse effect.

BRIEF SUMMARY

The present invention provides a hydrogen-oxygen fuel supplying system, which employ water as a fuel source and can reduce cost of fuel.

The present invention also provides a hydrogen-oxygen fuel supplying system, which employ water as a fuel source and can reduce pollution of air and environment.

The present invention provides a hydrogen-oxygen fuel supplying system, which is comprised of a water hydrolyzing apparatus, a heat dissipation apparatus, a filter, a supercharger, a hydrogen-oxygen container, and a pressure adjusting means. The water hydrolyzing apparatus is used to hydrolyze water thereby producing a mixture gas of hydrogen, oxygen, and water vapor. The heat dissipation apparatus is connected to the water hydrolyzing apparatus and used to dissipate heat generated in the water hydrolyzing apparatus. The filter is connected to the water hydrolyzing apparatus and used to filter water vapor in the mixture gas. The supercharger is connected to the filter and used to compress the hydrogen and oxygen. The hydrogen-oxygen container is connected to the supercharger and used to store compressed hydrogen and oxygen. The pressure adjusting means is connected to the hydrogen-oxygen container and used to regulate an output pressure of hydrogen and oxygen.

The hydrogen-oxygen fuel supplying system of the present invention can further includes an accumulator electrically to the water hydrolyzing apparatus, a power controller connecting the accumulator and the water hydrolyzing apparatus, a power converter connected to the supercharger, a filtering apparatus connected to the hydrogen-oxygen container, a check valve connected to the filtering apparatus, an electromagnetic valve connected to the check value, an air damper switch connected to the pressure adjusting means, and a mixer connected to the air damper switch. The accumulator is used to provide a portion of electrical power to the hydrolyzing apparatus. The power controller is used to improve and stabilize the output of electrical power. The power switch is used to convert an output voltage of the accumulator to a relative low voltage. The filtering apparatus further filters water vapor in the mixture gas and purifies output of the hydrogen and oxygen. The check valve is used to prevent reflux and explosion of the mixture gas. The mixer is used to fully mix the mixture gas and air.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Aspects of the present invention will be described accompany with the following embodiments. However, it is understood that the embodiments are intended to illustrative the present invention and can't be used to limit the scope of the present invention.

Embodiment 1

Figure 1:
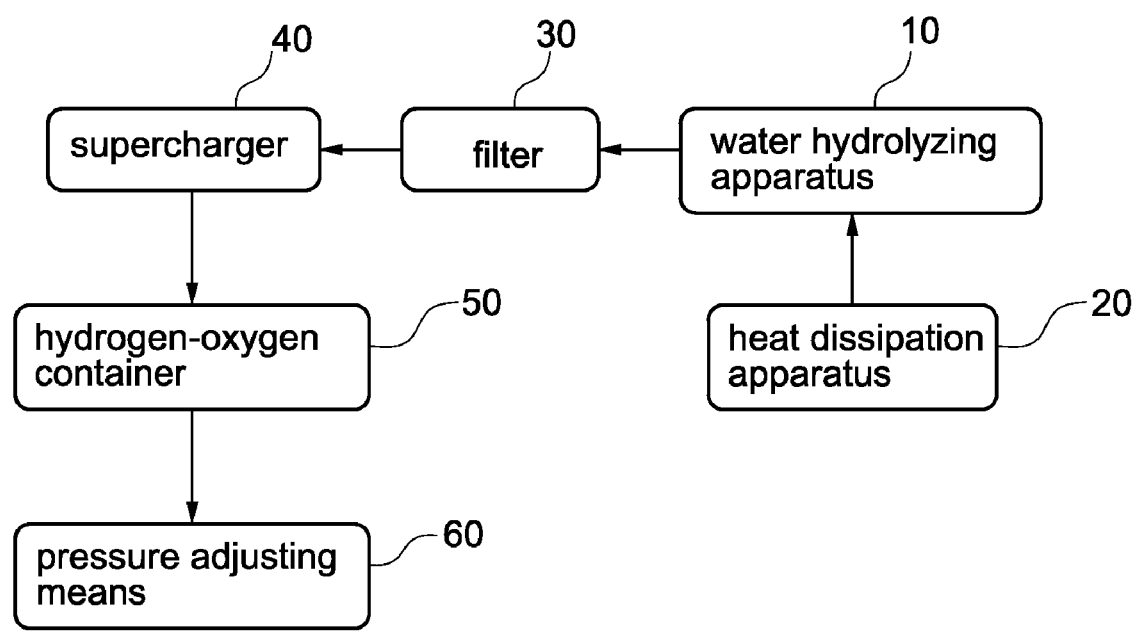
FIG. 1 is a schematic view showing a hydrogen-oxygen fuel supplying system in accordance with a first embodiment.

Please referring to FIG. 1, the present invention provides a hydrogen-oxygen fuel supplying system, which includes a hydrolyzing apparatus 10, a heat dissipation apparatus 20, a filter 30, a supercharger 40, a hydrogen-oxygen container 50, and a pressure adjusting means 60.

The hydrolyzing apparatus 10 includes a water electrolysis bath and two electrode plates disposed in the electrolysis bath. The two electrode plates hydrolyze the water into a mixture gas of hydrogen, oxygen and water vapor. Preferably, the two electrode plates are honeycomb shaped, that is a number of gas holes are distributed in the two electrode plates just like a honeycomb. The honeycomb shaped electrodes can maximize surface area of the two electrode plates thereby improving output of hydrogen and oxygen when water is hydrolyzed. Furthermore, a water pressure balancer (not shown) can be mounted in the hydrolyzing apparatus 10. The water pressure balancer is configured for balancing pressure of hydrogen and oxygen when hydrogen and oxygen are stored separately.

The heat dissipation apparatus 20 is mounted on a surface of the hydrolyzing apparatus 10. The heat dissipation apparatus 20 is used to dissipate heat generated in the hydrolyzing apparatus. Specifically, the heat dissipation apparatus 20 starts to dissipate heat when the temperature in the hydrolyzing apparatus 10 is higher than a predetermined value, and the heat dissipation apparatus 20 is shut down when the temperature in the hydrolyzing apparatus 10 is lower that the predetermined value. The heat dissipation apparatus 20 includes water-cooling pipes, fan, and temperature controlling member.

The filter 30, which is connected to the hydrolyzing apparatus 10, is configured for filtering water vapor in the hydrolyzed mixture gas thereby purifying hydrogen and oxygen.

The supercharger 40, which is used to compress the hydrogen and oxygen come from the filter 30, is connected to the filter.

The hydrogen-oxygen container 50 is connected to the supercharger 40. The hydrogen-oxygen container 50 is used to store compressed hydrogen and oxygen. In addition, the hydrogen-oxygen container 50 may include a hydrogen storing chamber and an oxygen storing chamber defined therein. The hydrogen storing chamber and the oxygen storing chamber can be used to storing hydrogen and oxygen respectively.

The pressure adjusting means 60 is connected to the hydrogen-oxygen container 50, and is configured for adjusting output pressure of the hydrogen and oxygen.

Figure 2:
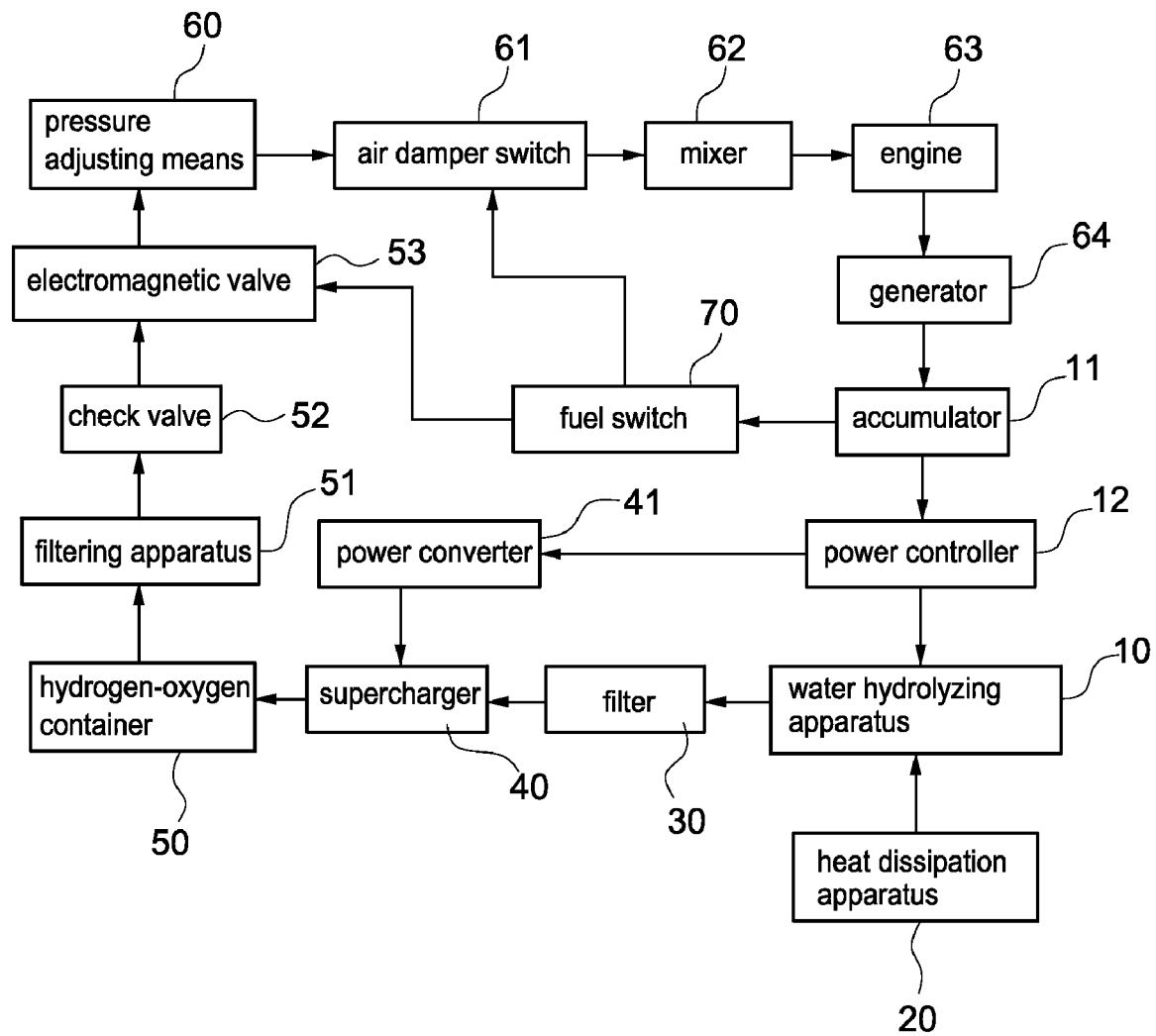
FIG. 2 is a schematic view showing a hydrogen-oxygen fuel supplying system in accordance with a second embodiment.

When applied into practice, the hydrogen-oxygen fuel supplying system can be connected to an engine 63 (please referring to FIG. 2). The hydrogen-oxygen fuel supplying system supplies hydrogen and oxygen fuel to the engine 63 thereby driving the engine 63 to work and provide power; therefore, the present invention utilize environment friendly water as fuel source, cost of fuel and air pollution caused by organic fuel can be reduced.

Embodiment 2

Please referring to FIG. 2, a difference of the present embodiment and the first embodiment is that the present embodiment can further include an accumulator 11, a power controller 12, a power converter 41, a filtering apparatus 51, a check valve 52, an electromagnetic valve 53, an air damper switch 61 and a mixer 62.

The accumulator 11 is electrically connected to the hydrolyzing apparatus 10. The accumulator 11 is configured for providing a portion of electrical power to the hydrolyzing apparatus 10.

The power controller 12 is electrically connected to the accumulator 11 and the hydrolyzing apparatus 10. The power controller 12 is used to improve and stabilize the output of electrical power. The power controller 12 is consisting of a capacitor and an electrical voltage regulator.

The power converter 41 is connected to the supercharger 40 for converting a high output voltage of the accumulator 11 to a relative low voltage. For example, the output voltage of the accumulator 11 equals to 36 volts, the power converter 41 converts the output voltage of 36 volts to 12 volts. The power converter 41 is a voltage regulator.

The filtering apparatus 51 is connected to the hydrogen-oxygen container 50. The filtering apparatus 51 further filters water vapor in the mixture gas and purifies output of the hydrogen and oxygen.

The check valve 52 is connected to the filtering apparatus 51 for preventing reflux and explosion of the mixture gas.

The electromagnetic valve 53, which includes a value, is connected to the check valve 52.

The air damper switch 61 is connected to the pressure adjusting means 60. The air damper switch 61 includes an air damper.

The mixer 62 is connected to the air damper switch 61. The mixer 62 is used to fully mix the mixture gas and air introduced from outside of the mixer 62. The mixer 62 is consisting of an air nozzle and a vortex mixing member.

When applied into practice, the hydrogen-oxygen fuel supplying system of the present invention can be connected to an engine 63 (please referring to FIG. 2). The hydrogen-oxygen fuel supplying system supplies gas fuel produced by mixing the mixture gas and air to the engine 63 thereby driving the engine 63 to work. The engine 63 drives a generator 64 to generating electrical power. The electrical power is returned to the accumulator 11 such that the accumulator is capable of providing electrical power uninterruptedly. The engine 63 can be an automobile engine, a marine engine, an aeronautic engine and etc. Therefore, the present invention utilize environment friendly water as fuel source, cost of fuel and air pollution caused by organic fuel can be reduced. Furthermore, a certain amount of electrical power is retained in the accumulator 11; the hydrogen-oxygen fuel supplying system can provide gas fuel uninterruptedly.

However, the present invention can't be merely restricted in applications of engine, it is understood that the present invention can also be used in gas stove or electric water heater as fuel source. In addition, the present invention can be combined with the engine 63 and the generator 64 thereby constituting a water fuel engine generator, which can be employed as electric power source in home applications, commercial applications, community applications and city applications, and so much as a new generation of electric power source that can used to replace conventional power house.

In the present embodiment, the hydrogen-oxygen fuel supplying system further includes a fuel switch 70, which is electrically connected to the accumulator 11. The fuel switch 70 is used to switch fuel fed into the hydrogen-oxygen fuel supplying system. The fuel can be one of water, gasoline, and alcohol. When the fuel switch 70 is set to a water fuel mode, the electromagnetic valve 53, the valve and air damper of the air damper switch 61 are opened, and then the hydrogen-oxygen fuel supplying system is ready for providing hydrogen-oxygen fuel; when the fuel switch 70 is set to a gasoline fuel mode or alcohol mode, the electromagnetic valve 53, the valve and air damper of the air damper switch 61 are closed, and then gasoline fuel or alcohol can be fed into the engine 63. Therefore, the hydrogen-oxygen fuel supplying system can also provide other fuel (gasoline for example) to the engine except providing hydrogen-oxygen fuel to the engine 63.

As described above, cost of fuel, pollution of air and environment can be reduced by using the hydrogen-oxygen fuel supplying system, the aforementioned disadvantages is therefore overcome and the hydrogen-oxygen fuel supplying system is valuable in industrial use indeed.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A hydrogen-oxygen fuel supplying system, comprising:
  a water hydrolyzing apparatus configured for hydrolyzing water thereby producing a mixture gas of hydrogen, oxygen, and water vapor;
  a heat dissipation apparatus connected to the water hydrolyzing apparatus, the heat dissipation apparatus being configured for dissipating heat generated in the water hydrolyzing apparatus;
  a filter connected to the water hydrolyzing apparatus, the filter being configured for filtering water vapor in the mixture gas;

an accumulator electrically connected to the water hydrolyzing apparatus;

a fuel switch electrically connected to the accumulator;

a power controller connected to the water hydrolyzing apparatus, wherein the power controller is configured for improving and stabilizing the output of electrical power;

a supercharger connected to the filter, the supercharger being configured for compressing the hydrogen and oxygen;

a power converter connected to the supercharger, wherein the power converter is configured for converting an output voltage of the accumulator to a relative low voltage;

a hydrogen-oxygen container connected to the supercharger, the hydrogen-oxygen container being configured for storing the hydrogen and oxygen;

a filtering apparatus connected to the hydrogen-oxygen container, wherein the filtering apparatus is configured for filtering water vapor in the mixture gas stored in the hydrogen-oxygen container and purifying an output of the hydrogen-oxygen container;

a check valve connected to the filtering apparatus, wherein the check valve is configured for preventing reflux of the mixture gas;

an electromagnetic valve connected to the check valve;

a pressure adjusting means connected to the hydrogen-oxygen container, the pressure adjusting means being configured for regulating an output of the hydrogen and oxygen;

an air damper switch connected to the pressure adjusting means; and a mixer connected to the air damper switch, wherein the mixer is configured for mixing the mixture gas and air.

* * * * *